(12) United States Patent
Bria et al.

(10) Patent No.: US 8,526,993 B2
(45) Date of Patent: Sep. 3, 2013

(54) POWER CONTROL FOR HOME BASE STATION WITH GNSS RECEIVER

(75) Inventors: Aurelian Bria, Nacka (SE); Farshid Ghasemzadeh, Sollentuna (SE); Muhammad Ali Kazmi, Bromma (SE); Kai Yu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 495 days.

(21) Appl. No.: 12/976,870

(22) Filed: Dec. 22, 2010

(65) Prior Publication Data

US 2011/0205106 A1 Aug. 25, 2011

Related U.S. Application Data (60) Provisional application No. 61/307,195, filed on Feb. 23, 2010.

(51) Int. Cl.
*H04M 1/00* (2006.01)

(52) U.S. Cl.
USPC .............. 455/522; 455/13.4; 455/127.1

(58) Field of Classification Search
USPC ............ 455/456.1, 11.1, 13.1, 457, 13.4, 455/127.1, 16, 427, 431, 522, 404.2
See application file for complete search history.

(56) References Cited

U.S. PATENT DOCUMENTS

| 7,800,534 B1 * | 9/2010 | Yenney et al. | 342/357.59 |
| 2009/0131095 A1 | 5/2009 | Rofougaran | |
| 2010/0201570 A1 * | 8/2010 | Shemar et al. | 342/357.59 |

FOREIGN PATENT DOCUMENTS
WO 98/02009 1/1998

OTHER PUBLICATIONS

3rd Generation Partnership Project. "GPS based Maximum Power Adjustment in HeNB." TSG-RAN Working Group 4 (Radio) meeting #54, R4-10xxxx (R4-100564), San Francisco, CA, USA, Feb. 22-26, 2010.
3rd Generation Partnership Project. "Text Proposal for 36.9XX: Power Control." TSG-RAN Working Group 4 (Radio) meeting #54, R1-10xxxx (R4-100565), San Francisco, CA, USA, Feb. 22-26, 2010.

* cited by examiner

*Primary Examiner* — Sujatha Sharma
(74) *Attorney, Agent, or Firm* — Coats & Bennett P.L.L.C.

(57) ABSTRACT

Embodiments herein include a method and a network node in a wireless communications network for controlling a maximum output power of the network node. The network node comprises a Global Navigation Satellite System (GNSS) receiver. The GNSS receiver receives signals from the GNSS. The method comprises determining whether a GNSS signal transmitted from the GNSS is considered detectable. If the GNSS signal is considered detectable, the method includes determining whether the GNSS signal is received directly from the GNSS or via a GNSS repeater. The method further includes selecting a power control method for controlling the maximum output power of the network node, based on at least one of the determination of whether the GNSS signal is considered detectable, and the determination of whether the GNSS signal is received directly from the GNSS or via the GNSS repeater.

31 Claims, 4 Drawing Sheets

POWER CONTROL FOR HOME BASE STATION WITH GNSS RECEIVER

RELATED APPLICATIONS

This application claims priority to U.S. Provisional Application Ser. No. 61/307,195, filed Feb. 23, 2010, and International Application No. PCT/SE2010/051049, filed Sep. 30, 2010, both of which are incorporated by reference herein in their entirety.

TECHNICAL FIELD

The present disclosure relates to a method and a network node in a wireless communications network. In particular, it relates to control a maximum output power of the network node located in the wireless communications network.

BACKGROUND

A femto base station or a so-called home base station has recently attracted much interest in wireless industry. Standardization process for home base stations is on going in 3GPP for both Evolved Universal Terrestrial Radio Access Network (E-UTRA) and IEEE 802.16. For UTRA, the home base station was standardized in release 8. However, in both UTRA and E-UTRA advanced features related to the home base station such as mobility procedures, interference management and home base station control etc are also being introduced for future releases. Femto base stations are already operational in other technologies such as GSM and 3GPP2 CDMA technologies (e.g. CDMA2000 1xRTT and High Rate Packet Data (HRPD)).

A femto base station e.g. Frequency Division Duplex/Time Division Duplex (FDD/TDD) home NodeB, TDD/FDD home eNB, GSM home BS, CDMA2000 1x home BS, HRPD home BS, IEEE 802.16 home base station or access point etc may be deployed at home or public/private premises such as shopping malls, office buildings, etc. A femto base station may share the same carrier with other macro/micro/pico base stations i.e. non femto base stations, or alternatively be assigned a dedicated carrier only for its operation. In the former scenario, femto base stations may generate unnecessary high interference to surrounding macro base stations. Therefore, the transmit power of the femto base station needs to be properly regulated and controlled.

In the legacy UTRAN specifications, three classes of base stations are defined, namely a wide area BS that serves macro cell deployment, a medium range BS that serves micro cell deployment and a local area BS that serves pico cell deployment i.e. smaller cells.

In E-UTRAN specifications two classes of base stations are defined, namely wide area BS that serves macro cell deployment and local area BS that that serves pico cell deployment. For the E-UTRAN, the wide area BS is also called as the general purpose BS or macro BS.

Unlike the above BS classes, home base stations are being developed to serve even smaller and more localized areas than pico cells. Home base stations operate under licensed frequency band and are currently under standardization within both 3GPP and IEEE 802.16.

Note that in principle, the terms femto base station, home base station, home NodeB or home eNodeB may refer to a same type of base station. Presently in UTRAN and E-UTRAN the term home NodeB or home eNodeB or base station is more commonly used. The latter is more generic as it covers any type of home base station. For simplicity and consistency we will therefore use the terminology home base station (HBS) hereinafter.

In both WCDMA and E-UTRAN FDD and TDD, the HBS maximum output power (Pmax_HBS) is limited to 20 dBm for non Multiple Input Multiple Output (MIMO) case, 17 dBm per antenna port in case of two transmit antennas or 14 dBm per antenna port in case of four transmit antennas. This is normally generalized as following:

$$P\text{max\_HBS}=20 \text{ dBm}-10*\log 10(N)$$

where N is the number of transmit antenna ports at the home base station.

The maximum output power (Pmax_HBS) comprises of the power of all downlink transmitted channels including common channels such as common pilot or reference signals, synchronization signal, control channels such as scheduling channels and data channels such as shared channel etc.

One main difference compared to other base station classes is that the HBS is owned by a private subscriber, who has the liberty to install it at any location. Thus strict network planning is not possible in case of HBS deployment. This is in contrast with other base station classes, which are deployed by an operator according to some well defined principles. The lack of precise network planning of HBSs may cause interference to other base stations, e.g. the macro BS. Due to this potential risk of interference, the maximum output power of the HBS should be regulated and controlled to minimize the impact on other base stations.

A HBS comprises of normal base station functions such as a transceiver that communicates to and from multiple User Equipments (UEs). In addition it may comprise a Measurement Unit (MU) equipped with a receiver for the purpose of performing measurements. This MU is similar to a normal UE receiver circuitry used for carrying out downlink measurements such as signal strength and signal quality of the neighbour cells (and the served cell wherein the UE is located in case of the UE performing the measurements). The measurement results may then be used to adjusting the maximum output power level. The performance requirements of the measurements done by the MU in the home base station are similar to, but not identical to, the UE measurements.

In order to distinguish the home BS radio measurements from the GPS measurements (i.e. when a GPS is integrated in the HBS), HBS radio measurements are sometimes called Cellular Radio Measurements (CRM).

As mentioned before, the HBS may operate on the same frequency channel as that of the surrounding macro BS. In this scenario mixed carrier may have to be deployed in order to offer HBS coverage. The mixed carrier scenario is obviously more challenging in terms of co-channel interference between: (1) Home base stations; and (2) home base stations and non-home BSs e.g. macro BS.

The interference situation becomes even worse in an UTRAN TDD and LTE TDD HBS deployment scenario. This stems from a fact that any difference in uplink and downlink slot or sub-frame configurations in HBS and non-HBS or within different HBSs results in severe cross-slot (or cross-sub-frame) interference. Even if the same TDD sub-frame configurations are used in all network nodes of the wireless communications network, due to the imperfect sub-frame timing due to practical constraints, there will be interference leakage.

In another scenario the HBS operates on an adjacent frequency channel to that of the surrounding macro BS (belonging to the operator which deploys the home BS). This scenario is less severe in terms of interference between the HBS and the macro BS. However, there would still be an impact of adjacent channel interference e.g. due to out of band emissions.

As stated above, a HBS comprises a MU equipped with a receiver for performing measurements over signals transmitted by other base stations e.g. non HBSs or other HBSs. This means that the HBS can perform similar measurements which are done by the actual UE. These measurements are going to be used by the HBS to perform adaptive power control i.e. maximum output power settings.

Such measurements may for example be as for Wideband Code Division Multiple Access (WCDMA) wherein three main quantities are used for mobility decisions and which may be used for adaptive power control namely (1) the Common Pilot Channel (CPICH) Received Signal Code Power (RSCP), (2) the CPICH Energy per chip to noise ratio Ec/No, and (3) the UTRA carrier Received Signal Strength Indicator (RSSI). The RSCP is normally measured by the UE on cell level basis on the CPICH. The UTRA carrier RSSI (the total received power and noise from all cells, including serving cells) is measured over the entire carrier. The CPICH Ec/No is identical to CPICH RSCP/RSSI.

In case of E-UTRAN, the following downlink radio measurements are specified primarily for mobility purpose but may be used for adaptive power control, namely the Reference Symbol Received Power (RSRP), and the Reference Symbol Received Quality (RSRQ), wherein the RSRQ is equal to the RSRP/carrier RSSI. The RSRP or the RSRP part in RSRQ in E-UTRAN is solely measured by the UE on cell level basis on reference symbols. There is no specific carrier RSSI measurement rather it is part of the RSRQ definition.

In GSM systems the following measurement is specified for mobility purpose and may further be used for adaptive power control namely the GSM Carrier RSSI.

In case of a cdma2000 1xRTT system the following measurement is used for mobility purpose and may further be used for adaptive power control namely the CDMA2000 1x RTT Pilot Strength.

In cdma2000 HRPD system the following measurement specified for mobility purpose and which may further be used for adaptive power control namely the CDMA2000 HRPD Pilot Strength.

The mentioned measurements, normally measurements on neighbour cells, are typically averaged over long time periods in the order of 200 ms or even longer to filter out the effect of e.g. fast fading. There is also an existing requirement on the UE to measure and report the neighbour cell measurements (e.g. RSRP and RSRQ in E-UTRAN) from certain minimum number of cells. For example, in both WCDMA and E-UTRAN the minimum number of cells, is 8 cells, comprising of one serving and seven neighbour cells, on the serving carrier frequency, or commonly termed as intra-frequency.

In a HBS the analogous measurements for adaptive power control may be expressed in general terms as: (1) Signal strength measured on pilot or reference signal (SS), which is analogous to UE measurements such as the CPICH RSCP in WCDMA or the RSRP in E-UTRAN; (2) Path Loss (PL) which is analogous to path loss UE measurement in WCDMA. Sometimes Path Gain (PG) is used instead, which simply is the reciprocal of PL; (3) Signal strength measured on pilot or reference signal i.e. Signal Quality (SQ), which is analogous to UE measurements such as CPICH Ec/No in WCDMA or RSRQ in E-UTRA; and (4) Received interference (Io), which is analogous to UE measurements such as carrier RSSI in WCDMA.

Thus, the maximum output power of the HBS may be regulated and controlled based on above mentioned measurements in order to minimize an impact on other cell applications, e.g. macro networks/BSs. Typically the maximum output power will be adjusted at time intervals in the order of several seconds or even longer. Depending upon the access technology of the HBS one or more HBS radio measurements specific to that access technology may be used by the HBS to adjust its maximum output power, and its transmit power level in general. These measurements need to be combined and processed in an adequate manner to make sure that the adjusted power leads to reduction in interference to the non HBSs. At the same time, the HBS should be able to operate at relatively higher output power when the interference to the outside is limited so that HBS resources are fully exploited.

For adaptive power control based on macro BS/UE measurements, the state of the art systems typically use one or more measurements for adapting the maximum output power. However, all measurements don't have the same accuracy levels. Some solutions only use signal quality measurements for adapting the output power. The signal quality measurements, which are analogous to UE measurements on CPICH Ec/No in UTRA, or RSRQ in E-UTRA, can provide better accuracy. However signal quality measurements do not fully incorporate and depict the overall interference on a carrier. Secondly these existing solutions don't enable HBS adaptive power unit to identify uniquely the proximity of a macro network.

Another known method used for regulating or controlling the maximum output power is a smart power control method that is based on satellite system measurements i.e. satellite based methods. Global Navigation Satellite System (GNSS) is the standard generic term for satellite navigation systems that enable UEs to locate their position and acquire other relevant navigational information. Another generic term currently used for satellite based positioning is Galileo and Additional Navigation Satellite System (GANSS). Among others, Global Positioning System (GPS) is the most well known example of GNSS, and is currently in operation for more than a decade. For simplicity we will below describe GPS, however, the principles of this disclosure equally applies to any type of navigation satellite system.

GPS comprises of a constellation of 24 to 32 medium earth orbit satellites revolving around the earth. The satellites transmit pilot signals and other broadcast information, which are received and processed by GPS receivers for determining geographical positions. Signals from certain number of satellites, e.g. 5 or more, should be received in order for the GPS receiver to accurately locate a geographical position of the UE.

Assisted GPS, generally abbreviated as A-GPS, is a system which can improve the start-up performance of a GPS satellite-based positioning system. It is used extensively with GPS-capable cellular phones, by taking advantage of the capability of the cellular network to provide the precise time, orbital data or almanac for the GPS satellites, etc. enabling the GPS receiver to lock to the satellites more rapidly. Among various positioning methods, A-GPS is considered to be one of the most viable and commonly used one.

The HBS may for example comprise an A-GPS receiver or simply a GPS receiver, or support other possible positioning method/system. Nevertheless in a legacy network i.e. a network comprising non HBSs, supporting GPS services, the non HBSs may also comprise a GPS receiver. The GPS receivers are normally used to provide some basic GPS related information e.g. detectable satellites, base station GPS coordinates etc, to the UEs. This GPS related information assists a UE in determining a GPS position relatively quickly especially after a cold start e.g. initial access to a network or coming out of a tunnel.

In order to receive a GPS signal with relatively good quality, a GPS receiver needs to have a Line-of-Sight (LoS) radio link to GPS satellites. However, when the GPS receiver is located inside a building, LoS connection between the GPS receiver and the GPS satellites may not be possible. Therefore, weak GPS signal may be received. One approach to cover indoor GPS users is to deploy a use of GPS repeaters. A simple GPS repeater simply receives the GPS signal via outdoor antenna deployed on top of a building, and then amplifies and retransmits the received GPS signal inside the building. Normally, GPS repeaters should only cover areas where GPS signals are unavailable or too weak, in order to avoid messing with the real GPS signals. GPS repeaters are being deployed in tunnels, large buildings etc. Especially in the case of large buildings, the HBS may also be used for providing indoor coverage for UEs. However, there may be overlapping zones where both GPS signals and repeated GPS signals are received.

Two types of information can be exploited from the GPS receiver, namely the number of detected satellites ($N_S$) and the reception quality ($Q_R$) of the detected satellites. In a normal environment, at least 4-5 satellites should be visible with sufficient quality to obtain good accuracy of a geographical location. Furthermore, the reception quality can be an aggregate value of all the detected satellites e.g. weighted average of all detected satellites or certain number of strongest satellites. Herein, we refer $N_S$ and/or $Q_R$ as GPS detection performance metrics or criteria.

Depending upon the GPS detection performance, the maximum output power of a HBS may be set according to different mapping functions. Any suitable mapping functions such as weighted sum or average of detected satellites ($N_S$) or of their reception quality ($Q_R$), or of both, may be used to create lookup tables with multiple maximum output power levels for a HBS.

The mapping function, which maps the GPS detection performance to the maximum output power of the HBS (Pmax_HBS) could use either $N_S$ or $Q_R$ or combination thereof as expressed in (1), (2) and (3):

$$F(\alpha_1 N_S) \rightarrow P_{max\_HBS} \quad (1)$$

$$F(\alpha_2 Q_R) \rightarrow P_{max\_HBS} \quad (2)$$

$$F(\alpha_1 N_S, \alpha_2 Q_R) \rightarrow P_{max\_HBS} \quad (3)$$

Where: $\alpha 1$ and $\alpha 2$ are the weighted factors. Any suitable mapping function such as weighted sum or average can be used.

The above mapping functions are used to create lookup tables to generate the maximum output power based on NS or QR or combination thereof.

A poor GPS detection performance corresponds to a scenario where the HBS is isolated and shielded from outside/ other base stations. This means less interference is generated by the HBS e.g. to the outside macro BS. Therefore higher maximum output power can be used in order to improve the HBS coverage and performance indoor. On the other hand, a good GPS detection performance indicates that the location of the HBS may cause significant interference to the outdoor network and therefore lower maximum output power should be used at home base station in order to protect the Macro UE.

The above mentioned smart output power control method based on GPS measurements i.e. detection performance, may avoid some problems which may arise with adaptive power control. However, the smart output power control method will not work in scenarios where GPS repeaters are deployed inside the premises. This is because in such scenarios, strong repeated GPS signals are always received no matter where the HBSs are located indoors. Therefore it is almost impossible to decide whether the HBS is isolated and adjust the maximum output power accordingly.

Thus, both adaptive power control based on macro BS/UE measurements and smart output power control based on GPS measurements on the one hand are unable to fully protect the macro network as HBSs may be operating at higher output power than desired. On the other hand the maximum output power may be conservatively set causing poor coverage and performance loss of HBS.

SUMMARY

Embodiments herein include a maximum output power control method which advantageously ensures achievement of a good balance between macro networks/BSs protection and system performance of HBSs.

Some embodiments, for example, include a method in a network node for controlling a maximum output power of the network node located in a wireless communications network, wherein the network node comprises a Global Navigation Satellite System receiver, GNSS receiver. The GNSS receiver is used for receiving signals from the GNSS. The method comprises determining whether a measured GNSS signal transmitted from the GNSS is considered detectable and, if so, determining whether the received GNSS signal is received directly from the GNSS or via a GNSS repeater. The method further comprises selecting a power control method for controlling the maximum output power of the network node, based on a result from the determining.

Other embodiments include a network node for controlling a maximum output power in a wireless communications network, wherein the network node is configured to receive signals from a Global Navigation Satellite System, GNSS, by aid of a GNSS receiver. The network node further comprises a signal processing and control circuit configured to determine whether a measured GNSS signal is detectable and, if so, determine whether the received GNSS signal is received directly from the GNSS or via a GNSS repeater. The network node also comprises a power control circuit configured to select a power control method for controlling the maximum output power of the network node. The selection of a power control method is based on a result from the determining.

An advantage achieved by at least one of the above mentioned embodiments is the possibility to distinguish between a GNSS signal and a repeated GNSS signal.

Another advantage is that maximum output power may be selected, giving relatively good coverage and performance without significantly interfering with surrounding nodes in the wireless communications network.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

Presently in UTRAN and E-UTRAN the terms home NodeB (home NB) or home eNodeB (home eNB) or home base station are used more commonly. The latter is more generic as it covers any type of home base station. The term Home Base Station (HBS) and home Node B are interchangeably used in the rest of the disclosure. These terms also cover femto base station (femto BS), home eNB or similar base station type.

Note also that the term HBS may refer to any type of BS, which is capable of serving a localized radio environment e.g. assembly hall, office, home, indoor shopping mall, etc. For example a pico base station or a relay node serving a local area may also be regarded as home BS. Similarly the macro BS refers to any type of BS, which is capable of serving an open area radio environment e.g. outdoor areas, city centres etc. For example a micro base station or an outdoor relay node serving an open area may also be regarded as macro BS according to the embodiments mentioned above.

Figure 1:
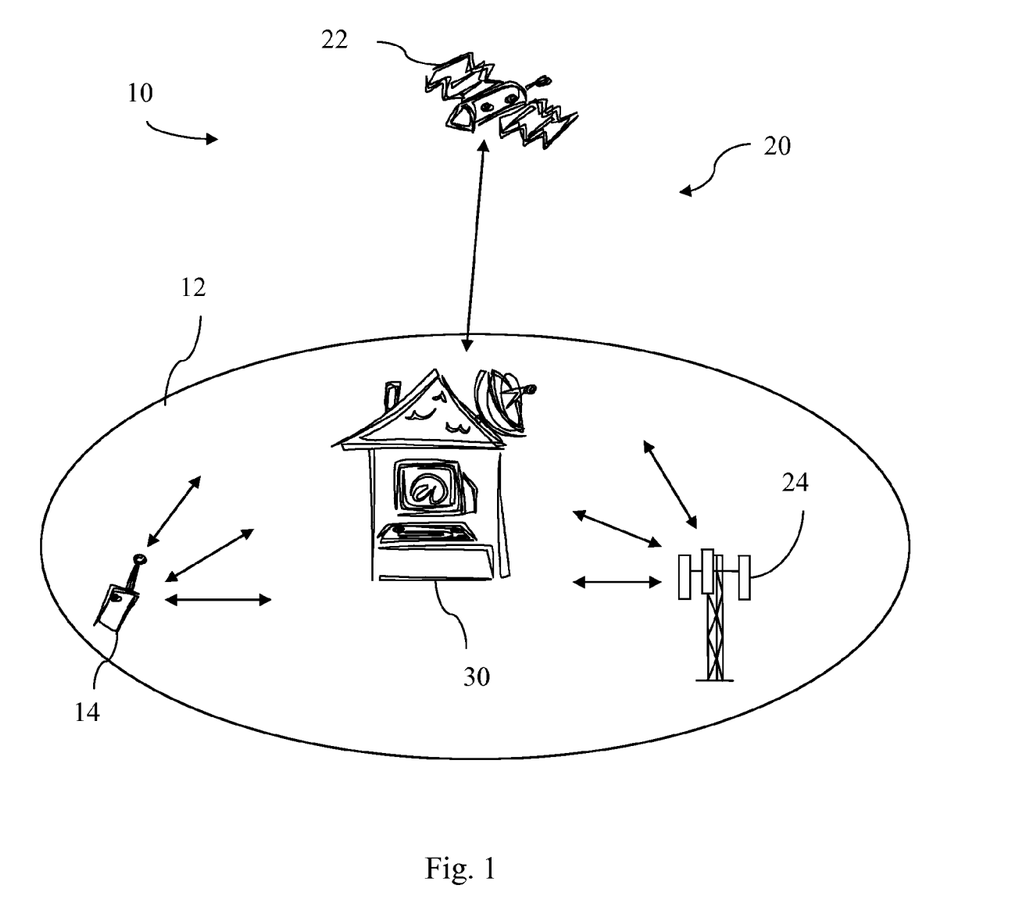
FIG. 1 is a schematic overview illustrating an embodiment of a wireless communications network.

Referring now to the drawings, FIG. 1 illustrates a wireless communications network 10 including a home base station 30 i.e. network node, providing radio coverage in a local area 12 i.e. served cell, to a user terminal 14 i.e. User Equipment (UE), and a Global Navigation Satellite System (GNSS) 20. The wireless communications network, i.e. communication system, may comprise for example a WCDMA, LTE, WIMAX system or any other similar communication system and corresponding macro base stations (macro BSs), not shown in figure. Note that the served cell 12 is a cell served by the HBS 30 and/or a cell served by the macro BS, not shown in figure, or a cell overlapping in coverage between macro BS and HBS 30.

Following above, the GNSS 20, such as a GPS system, comprises a plurality of navigation satellites 22 and GNSS repeaters 24 i.e. repeater stations which repeated a GNSS signal. The GNSS repeater 24 (signal repeater) receives the GNSS signal, amplifies the received GNSS signal and retransmits the amplified signal. The GNSS repeater is therefore normally equipped with a receiver and transmitter circuitries. For simplicity, only one of each is shown in FIG. 1. Depending on a deployment scenario, the HBS 30 may receive GNSS signals, positioning signals, directly from the GNSS 22 or from the GNSS repeater 24.

Figure 2:
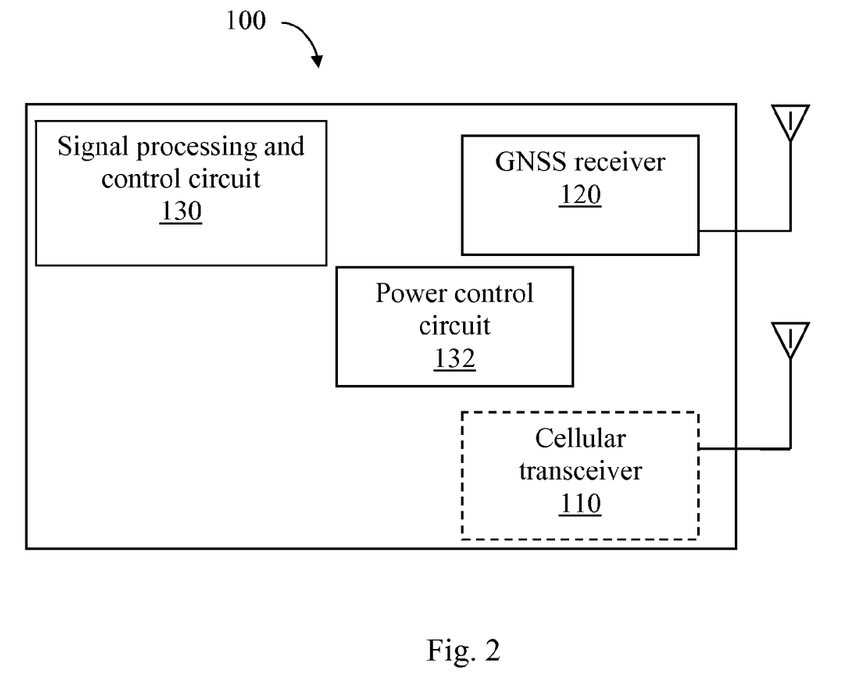
FIG. 2 is schematic block diagram illustrating an example embodiment of a network node.

FIG. 2 illustrates an exemplary network node i.e. HBS 30. The network node 100 comprises a GNSS receiver 120, a signal processing and control circuit 130 and a power control circuit 132. The network node 100 normally comprises a cellular transceiver 110, or a transmitter and a receiver, for communicating with user terminals 14 and which may operate according to known standards, such as WCDMA, LTE, and WIMAX.

The GNSS receiver 120 is configured to receive GNSS signals (positioning signals) from either a navigation satellite 22 or via a repeater 24, or both. The GNSS receiver 120 may detect if there exists any GNSS signals. The GNSS receiver 120 may also detect an absence of a GNSS signal. Different method for controlling the maximum output power of the network node 100 may be executed depending on if a GNSS signal is detectable or not. A received GNSS signal may be considered as detectable if the signal level is above a predefined threshold value. If the received GNSS signal is below the threshold value then the GNSS signal may be considered as undetectable. Note that this also covers the case when there is no GNSS signal to receive at all. The predefined threshold value may be pre-stored in the network node 100 or obtained form other network nodes such as the MME, the HLR/HSS or the Macro BS.

In an example of an embodiment, the power control circuit 132, in case of the received GNSS signal is below the predefined threshold, is configured to select between an nominal maximum output value and an adaptive power control method that is based on macro base station measurements and/or user equipment measurements. The macro base station measurements are performed or requested by the signal processing and control circuit 130 or by a measurement unit in the network node 100, not shown in FIG. 2 or FIG. 3. The macro base station measurements are performed or requested, e.g. HBS, on signals transmitted by the macro base station(s). Examples of macro base station measurements may comprise of total received interference, carrier RSSI, CPICH RSCP, CPICH Ec/No etc. The UE measurements are performed by the UE served by the network node 100, e.g. HBS, on the signals transmitted by other base stations including macro base stations. Examples of UE measurements may comprise of carrier RSSI, CPICH RSCP, CPICH Ec/No etc. For example two or more of the macro and/or UE measurement quantities may be weighted with some predefined values or factors and the aggregate sum may be mapped to the maximum output power level. The mapping may be based on a pre-defined look up table mapping the aggregating values of the measurements to the maximum output power levels.

In an example of an embodiment, the signal processing and control circuit 130 determines if a GNSS signal is considered to be detectable or not and then if the GNSS signal is strong enough or not. The signal processing and control circuit 130 may also process signals transmitted or received by the cellular transceiver 110, as well.

In a first example of embodiments, the signal processing and control circuit 130 may be configured to determine whether the received GNSS signal is received directly from the GNSS or via the GNSS repeater by comparing the received GNSS signal with a reference GNSS timing to determine if there is a time delay.

For example, when an original GNSS signal is retransmitted by a GNSS repeater, the retransmitted (repeated) GNSS signal experiences certain time delay depending on GNSS repeater requirements specified in the relevant repeater specification i.e. delay compared with the received original GNSS signal. A typical value of time delay is at a level of a few micro seconds e.g. 5-10 μs. As all GNSS signals from different GNSS satellites experience same time delay, therefore a retrieved position as well as timing information from the GNSS receiver at the network node 100 e.g. HBS30, are relatively more inaccurate compared to the GNSS signal(s) received only from the GNSS satellite(s).

Embodiments herein therefore acquire a reference GNSS timing from a reliable source and then compare this acquired timing with the timing obtained/received from the GNSS receiver. If the difference between the acquired reference GNSS timing and the timing received from the GNSS receiver is larger than a timing threshold, it may be determined that the received GNSS signal is retransmitted by a GNSS repeater. Otherwise, the received GNSS signal is the original GNSS signal. The threshold may be a pre-defined value or a configurable value which may be obtained from another network node such as via backhaul link or implementation specific i.e. network node or HBS implementation dependent.

There are several possibilities to acquire reference GNSS timings, some practical examples are mentioned here:
- The network node 100 (or HBS 30) may acquire reference GPS timing from a UE i.e. by sending requests to one or more UE in a served cell.
- The Precision Time Protocol (PTP) that is a standard protocol and which may be used to synchronize clocks of different end devices over a network at speeds faster than one microsecond. The PTP may provide accurate clock synchronization for network nodes (or HBSs) without use of the GNSS. The network node may therefore acquire an accurate reference GNSS timing by synchronizing to another source such as another network node that has correct GNSS timing using PTP.
- Pre-configured GNSS timing for all satellites in the network node 100 upon manufacturing of the network node.

In a second example of embodiments, the signal processing and control circuit 130 may be configured to determine whether the received GNSS signal is received directly from the GNSS or via the GNSS repeater by obtaining information regarding areas covered by GNSS repeaters or locations of GNSS repeaters via a backhaul network connection. Although the GNSS repeater is helpful in providing GNSS service to indoor users i.e. UEs, it may also cause interference to other GNSS receivers that receive data from both GNSS satellites and GNSS repeaters in overlapping zones. Therefore strict regulations are already employed on the GNSS repeater in many countries such as the United Kingdom and EU. It is likely for network operators to get access to information regarding coverage areas for GNSS repeaters, as in known documents. Hence a network operator may configure this information in the core network or in any other network node e.g. operation and management node. The home base station may acquire the information about the coverage areas where GNSS repeaters are deployed via backhaul communication with the core network or with the relevant network node containing this information. In such case, upon receiving the GNSS signal, the network node 100 contacts another network node i.e. central network node or mobile core network node, e.g. via backhaul link/network, and obtains information regarding areas covered by GNSS repeaters. The network node 100 then decides whether the received GNSS signal is from a GNSS repeater or not based on the obtained information about GNSS repeaters coverage areas. This approach requires signalling and exchange of messages between the network node 100 and other network nodes in the wireless communications network e.g. via the backhaul link/network.

In a third example of embodiments, the signal processing and control circuit 130 may be configured to determine whether the received GNSS signal is received directly from the GNSS or via the GNSS repeater by receiving a pilot signal from the GNSS repeater. For example for a more advanced GNSS repeater, a special pilot or reference signal may be transmitted. The power level of this special pilot or reference signal may be proportional to the repeated GNSS signal. If the received pilot or reference signal level is above a certain threshold, it may be detected by the network node 100 that the received GNSS signal is in fact transmitted by a GNSS repeater. The pilot or reference signal may also incorporate the identifier of the GNSS repeater in use.

This example, however, requires additional modification both at GNSS repeaters and network nodes in order to transmit and detect special pilot or reference signals respectively.

In a fourth example of embodiments, the signal processing and control circuit 130 may be configured to obtain measurements on radio environment characteristics in a served cell and comparing the measurements with characteristics of the received GNSS signal, to determine whether the received GNSS signal is received directly from the GNSS or via the GNSS repeater.

According to this example, one or more metrics depicting radio environment characteristics or properties or behaviour of the received GNSS signal and of the network node 100 typical environment e.g. indoor or localized areas, are used to determine whether the received GNSS signal is directly from a GNSS satellite or from the GNSS repeater. The example is further illustrated by here using e.g. Excess Delay/Delay Spread of Received GNSS Signal which are specific and highly relevant metrics characterizing the radio environment i.e. radio environment characteristics. However other relevant radio environment related metrics are not precluded and might be used/defined as the radio environment characteristics.

In areas covered by the GNSS repeater, normally there exist overlapping zones where both signals directly from GNSS satellites and signals from the GNSS repeater are received. Typically the repeated GNSS signal is delayed by a total time delay $\tau_{total}$ comparing to an original GNSS signal i.e. the signal received directly from the GNSS satellite, due to the delays caused by cable, repeater, as well as propagation, i.e.

$$\tau_{total} = \tau_{cable} + \tau_{repeater} + \tau_{prop} \tag{1}$$

A typical number of the total time delay $\tau_{total}$ is larger than several micro seconds. The total time delay may be interpreted as the maximum delay covering the last path i.e. until the last significant path is received.

In a typical indoor environment, a maximum excess time delay is at a level of a few hundred nano seconds (ns) and a Root Mean Square (RMS) delay spread is less than 100 ns. The Excess time delay is generally defined as a RMS value. If both the original GNSS signal and the repeated GNSS signal are received and detected by the network node 100, then the maximum excess time delay is at the level of a few micro seconds (ms). Therefore the maximum excess time delay and RMS delay spread become much larger than the typical values for an indoor environment. By comparing these two parameters, the network node 100 may determine whether the GNSS repeater is operational in its vicinity or not. A threshold value may also here be used for comparison i.e. the maximum excess time delay or RMS delay spread may be specific to different scenarios e.g. radio environment characteristics. Furthermore the threshold values may be pre-determined values, signalled to the network node 100 by used of the backhaul link/network or network node 100 implementation specific. For instance the network node 100 may measure the excess time delay and RMS delay spread based on cellular radio signals i.e. non-GNSS signals or more specifically those received from base stations such as macro BS or HBS or UE. The network node 100 then uses the received cellular signals for determining the threshold values, which in turn are used for comparing the received cellular signals with those of the received GNSS signal received by the GNSS receiver 120.

On the other hand, if the maximum excess time delay and the RMS delay spread are not too far away from those typical values for indoor radio environment, where typical network nodes (or HBSs) operate or for any radio environment where the network node is currently operating, it is still very difficult to distinguish between a repeated and an original/direct GNSS signal. This is because when the original GNSS signal i.e. direct GNSS signal, from GNSS satellites is too weak to be detected or to be considered detectable, similar maximum excess time delay and RMS delay spread will be obtained for the repeated GNSS signal.

Although the above mentioned example does not provide a totally complete stand-alone solution to distinguish between original/direct GNSS signal and repeated GNSS signal, it is the simplest method comparing to other solutions/methods described previously in the first to third examples above. This is because this solution/method requires no extra signalling, information exchange, or further modification on both the GNSS repeater and on the network node 100. Therefore this solution/method is useful specially when combined with other solutions/approaches. For example, when the network node 100 obtains information regarding GNSS repeater coverage areas via a backhaul link/network, such information may not be very accurate especially in the overlapping zone where original GNSS signal i.e. direct GNSS signal, and repeated GNSS signal are received together. In the scenario comprising of overlapping areas between GNSS repeater and GNSS satellite coverage, the network node 100 may by analyzing the excess time delay and/or delay spread of the received GNSS signal, easily solve this e.g. by determining/detecting whether the received signal comprises both original GNSS signal and repeated GNSS signal.

In an example of embodiments, the power control circuit 132 may be configured to select an adaptive power control method that is based on macro BS measurements and/or user equipment measurements, when the received GNSS signal is determined to be received via the GNSS repeater. Examples of measurements that may be used for adaptive power control are one or more of the following: signal strength measured on pilot or reference signal (SS); Path Loss (PL); Signal strength measured on pilot or reference signal (SQ) or Received interference (Io).

In an example of embodiment, the power control circuit 132 may be configured to select a smart power control method that is based on GNSS signal measurements, when the received GNSS signal is determined to be received directly from the GNSS, e.g. based on location of network node compared with location of known repeaters and/or neighbour macro BSs. For example the network node 100, e.g. the home base station 30, may obtain information from the network operator via backhaul network regarding areas covered by the GNSS repeaters. The information may be obtained and stored in the background and updated from time to time. The smart power control method may further also be based on macro base station measurements and/or user equipment measurements as mentioned above for the adaptive power control method. Both the adaptive and the smart power control method may be used to control the maximum output power of the network node 100 which for example the HBS 30.

Figure 3:
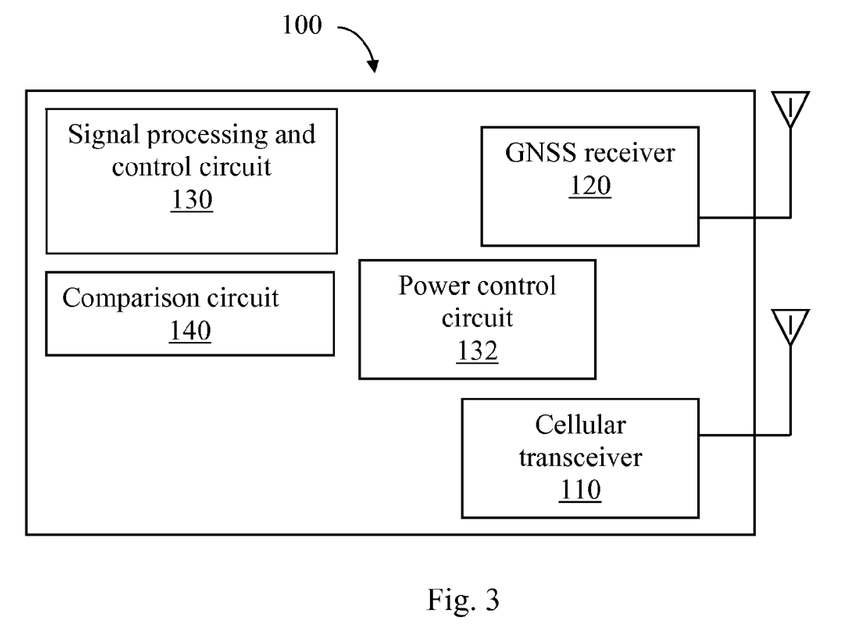
FIG. 3 is a schematic block diagram illustrating further embodiments of the network node.

In an example of embodiment, the network node 100 may further comprise a comparison circuit 140, as illustrated by FIG. 3, configured to compare a received GNSS signal with the predefined threshold value in order to decide if the received GNSS signal is to be considered detectable or not.

In an example of embodiment, the signal processing and control circuit 130 may include the power control circuit 132 for controlling the transmit power of a network node 100. The power control circuit 132 may implement adaptive power control algorithms based on cellular radio signals. The power control circuit 132 may also implement a GNSS assisted adapted power control algorithms to reduce interference i.e. a smart power control method that is based on GNSS signal measurements.

Figure 4:
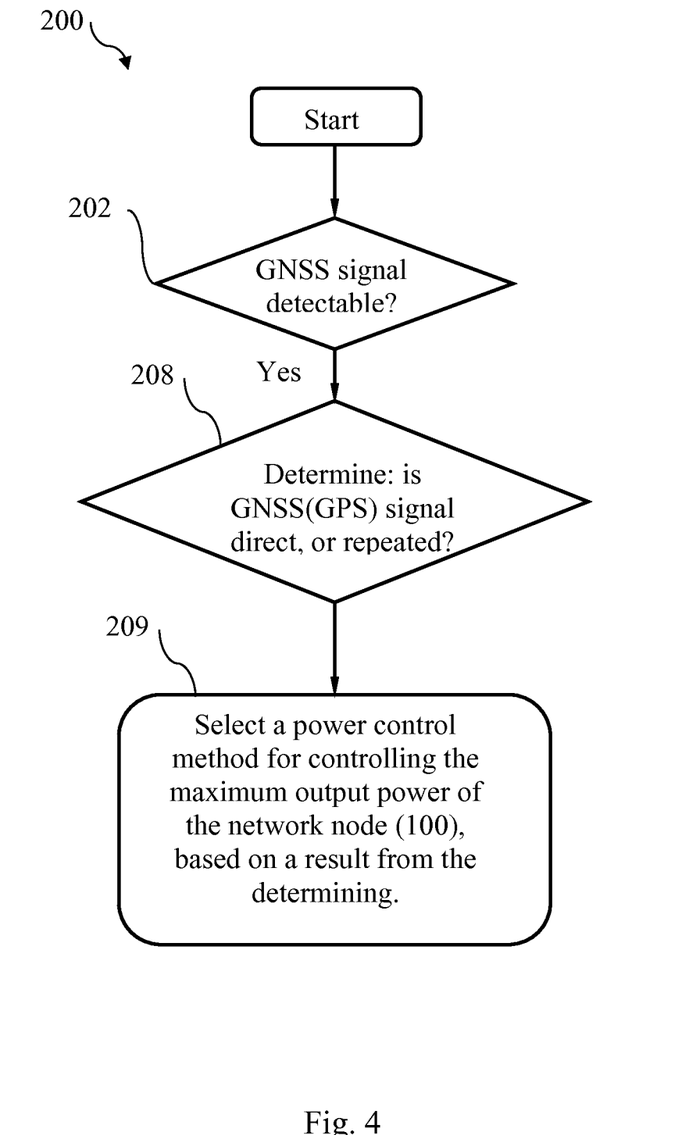
FIG. 4 is a flowchart depicting an example embodiment of a method in a network node.
Figure 5:
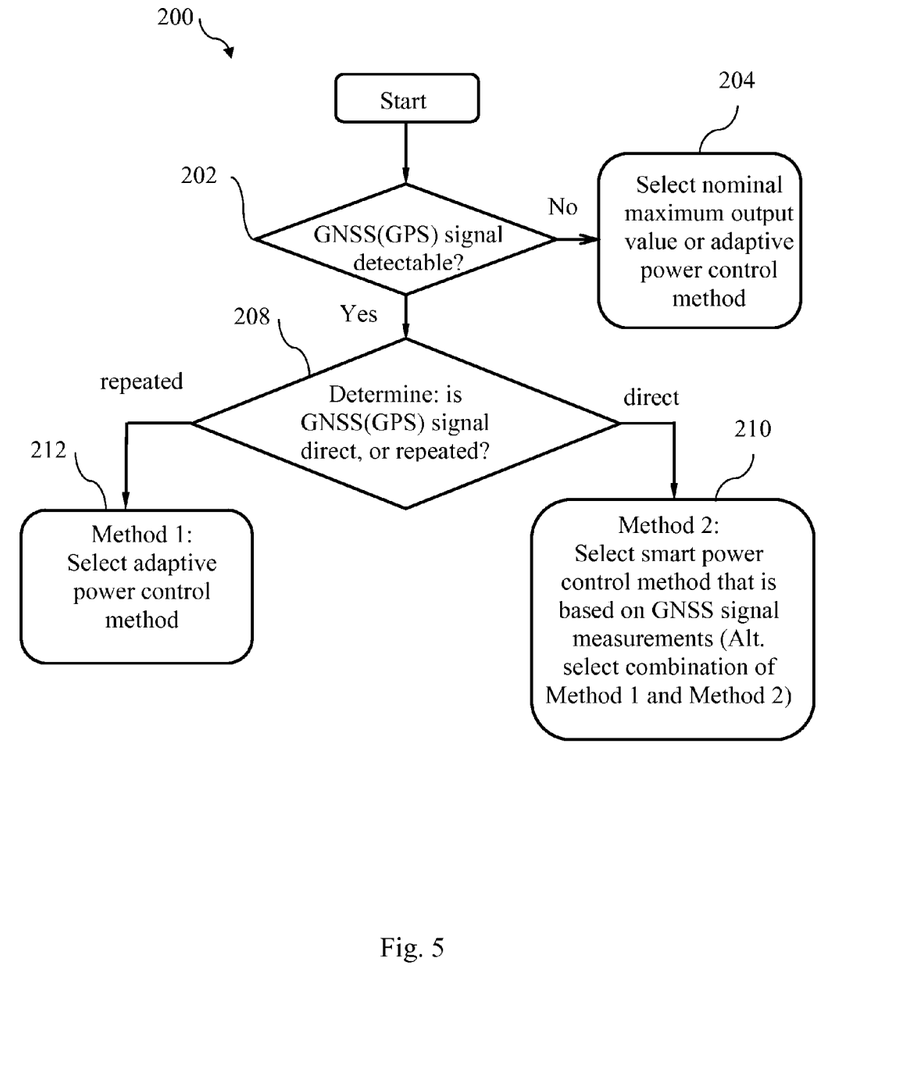
FIG. 5 is a flowchart depicting yet further examples of embodiments of the method in a network node.

FIG. 4 is a flowchart depicting example of embodiments of a method 200 which may be implemented in the network node 100 e.g. HBS 30. The method 200 is provided for controlling a maximum output power of the network node 100 which is located in the wireless communications network 10 and wherein the network node 100 is configured to comprise a GNSS receiver 120 for receiving signals from the GNSS. The method comprises determining 202 whether a received GNSS signal transmitted from the GNSS is considered detectable. This may be done by the GNSS receiver detecting the existence of a GNSS signal or the existence of a very weak GNSS signal. The GNSS signal received from the GNSS is considered detectable if it exceeds a predefined threshold. When the GNSS signal is below the threshold then it is considered that the GNSS signal is undetectable. A non-receivable GNSS signal may also be considered as one belonging to the GNSS signals falling below the threshold. According to an example of embodiment, when the GNSS signal is determined to not be considered detectable, a nominal maximum output value or an adaptive power control method is to be selected 204, as illustrated by FIG. 5. Note, that the nominal maximum output value may be the maximum possible output power available at the network node 100 i.e. the HBS 30. In an example of embodiment the adaptive power control method is based on macro base station measurements and/or user equipment measurements e.g. Signal Strength (SS) such as CPICH RSCP in UTRAN or RSRP in E-UTRAN, Signal Quality (SQ) such as CPICH Ec/No in UTRAN or RSRQ in E-UTRAN, Path Loss (PL), Path Gain (PG), Interference (Io) or like.

When the GNSS signal received from the GNSS is determined to be detectable the method 200 further comprises determining 208 whether the received GNSS signal is received directly from the GNSS or via a GNSS repeater 24. The received GNSS signal may be determined to be directly received or received via the GNSS repeater 24 by one or more of the following procedures:

by comparing the detected GNSS signal with a reference GNSS timing to determine if there is a time delay, wherein the reference GNSS timing may be requested according to one or more of the following procedures: sending a request to a user equipment served by the network node; using a precision time protocol to synchronize to another more reliable network node; or, sending a request for pre-configured GNSS timings for one or more satellites.
  by obtaining information regarding areas covered by GNSS repeaters or locations of GNSS repeaters via a backhaul network connection.
  by receiving a pilot or reference signal from the GNSS repeater and determining that the received GNSS signal is received via the GNSS repeater when a level of the received pilot or reference signal is above a predefined threshold value. The received pilot or reference signal may further comprise a GNSS repeater identifier for identifying that the GNSS repeater is a GNSS repeater.
  by measuring radio environment characteristics in a served cell and comparing the measured radio environment characteristics with characteristics of the detected GNSS signal.

Continuing with the description of the method illustrated by FIG. 4, the method comprises a further step of selecting 209 a power control method for controlling the maximum output power of the network node 100, based on a result from the determining.

FIG. 5 is a flowchart depicting yet further examples of embodiments of the method 200 mentioned above. According to one example of an embodiment the method 200 comprises selecting 212 the adaptive power control method that is based on macro base station measurements and/or user equipment measurements, when the result from the determining reveals that the received GNSS signal is received via the GNSS repeater. According to further examples of embodiments the method 200 comprises selecting 210 a smart power control method that is based on GNSS signal measurements, alternatively in combination with the adaptive power control method, when the result from the determining reveals that the received GNSS signal is received directly from the GNSS.

It is to be noted that any internal electronics of the network node 100 or HBS 30, not completely necessary for understanding the present methods and their embodiments as well as the aspects of embodiments, has been omitted from FIG. 1 to FIG. 3, for clarity reasons.

Further, it is to be noted that some of the described circuits 110-140 comprised within the network node 100 are to be regarded as separate logical entities but not with necessity separate physical entities. To mention just one example, the signal processing and control circuit 130, the GNSS receiver and the power control circuit 132 may be comprised or co-arranged within a same physical circuit.

The method 200 in the network node 100 may further be implemented through one or more processor circuits 110-140, in a home base station e.g. HBS 30, or in a similar small area base station, together with computer program code for performing the functions of the present method. Thus a computer program product, comprising instructions for performing the method in a network node may assist, when the computer program product is loaded into or run in the network node 100.

The computer program product mentioned above may be provided for instance in the form of a data carrier carrying computer program code for performing the method in a network node 100 when being loaded or run on the network node 100. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloadable to the network node 100 remotely, e.g. over an Internet or an intranet connection.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a network node for controlling a maximum output power of that network node, the network node located in a wireless communications network and comprising a Global Navigation Satellite System (GNSS) receiver for receiving GNSS signals transmitted from the GNSS, the method comprising:
   determining whether a GNSS signal transmitted from the GNSS is considered detectable;
   if the GNSS signal is considered detectable, determining whether the GNSS signal is received directly from the GNSS or via a GNSS repeater; and
   selecting a power control method for controlling the maximum output power of the network node, based on at least one of said determination of whether the GNSS signal is considered detectable, and said determination of whether the GNSS signal is received directly from the GNSS or via the GNSS repeater.

2. The method according to claim 1, wherein said determining whether the GNSS signal is detectable comprises determining that the GNSS signal is detectable if a signal level of the GNSS signal is above a predefined threshold value.

3. The method according to claim 2, wherein said selecting comprises selecting between a nominal maximum output value and an adaptive power control method for controlling the maximum output power of the network node, if the signal level of the GNSS signal is below the predefined threshold value, the adaptive power control method being based on at least one of macro base station measurements and user equipment measurements.

4. The method according to claim 1, wherein said selecting comprises selecting an adaptive power control method that is based on at least one of macro base station measurements and user equipment measurements, if the GNSS signal is received via the GNSS repeater.

5. The method according to claim 1, wherein said selecting comprises selecting a smart power control method that is based on GNSS signal measurements, if the GNSS signal is received directly from the GNSS.

6. The method according to claim 5, wherein said smart power control method is further based on at least one of macro base station measurements and user equipment measurements.

7. The method according to claim 1, wherein said determining whether the GNSS signal is received directly from the GNSS or via the GNSS repeater comprises comparing the GNSS signal with a reference GNSS timing to determine if receipt of the GNSS signal has been delayed in time compared to the time the GNSS signal would have been received had it been received directly from the GNSS.

8. The method according to claim 7, further comprising requesting the reference GNSS timing by one or more of:
   sending a request to a user equipment served by the network node;
   using a precision time protocol to synchronize to another more reliable network node; and
   sending a request for pre-configured GNSS timings for one or more satellites.

9. The method according to claim 1, wherein said determining whether the GNSS signal is received directly from the GNSS or via the GNSS repeater comprises obtaining information regarding areas covered by GNSS repeaters, or locations of GNSS repeaters, via a backhaul network connection.

10. The method according to claim 1, wherein said determining whether the GNSS signal is received directly from the GNSS or via the GNSS repeater comprises receiving a pilot or reference signal from the GNSS repeater.

11. The method according to claim 10, wherein said determining whether the GNSS signal is received directly from the GNSS or via the GNSS repeater comprises determining that the GNSS signal is received via the GNSS repeater when a level of the received pilot or reference signal is above a predefined threshold value.

12. The method according to claim 10, wherein the received pilot or reference signal further comprises a GNSS repeater identifier.

13. The method according to claim 1, wherein said determining whether the GNSS signal is received directly from the GNSS or via the GNSS repeater comprises measuring radio environment characteristics in a served cell and comparing the measured radio environment characteristics with characteristics of the GNSS signal.

14. The method according to claim 13, wherein said determining whether the GNSS signal is received directly from the GNSS or via the GNSS repeater comprises using the measured radio environment characteristics and the characteristics of the GNSS signal to calculate at least one of maximum excess delays and root mean square delay spreads.

15. The method according to claim 1, wherein the GNNS comprises a Global Positioning System (GPS) and the GNSS signal comprises a GPS signal.

16. The method according to claim 1, wherein the network node is any of: a home base station; a home NodeB; a home eNodeB; a femto base station; a pico base station; or, a relay node.

17. A network node for controlling a maximum output power in a wireless communications network, the network node comprising:
    a Global Navigation Satellite System (GNSS) receiver configured to receive signals from a GNSS;
    a signal processing and control circuit configured to determine whether a GNSS signal transmitted from the GNSS is considered detectable, and, if the GNSS signal is considered detectable, to determine whether the GNSS signal is received directly from the GNSS or via a GNSS repeater; and
    a power control circuit configured to select a power control method for controlling the maximum output power of the network node, based on at least one of said determination of whether the GNSS signal is considered detectable, and said determination of whether the GNSS signal is received directly from the GNSS or via the GNSS repeater.

18. The network node according to claim 17, wherein the network node further comprises a comparison circuit configured to compare a signal level of the GNSS signal with a predefined threshold value for determination of whether the GNSS signal is detectable.

19. The network node according to claim 18, wherein the power control circuit is configured to select between a nominal maximum output value and an adaptive power control method for controlling the maximum output power of the network node, if the signal level of the GNSS signal is below the predefined threshold, the adaptive power control method being based on at least one of macro base station measurements and user equipment measurements.

20. The network node according to claim 17, wherein the power control circuit is configured to select an adaptive power control method that is based on at least one of macro base station measurements and user equipment measurements, if the GNSS signal is received via the GNSS repeater.

21. The network node according to claim 17, wherein the power control circuit is configured to select a smart power control method that is based on GNSS signal measurements, if the GNSS signal is received directly from the GNSS.

22. The network node according to claim 21, wherein the smart power control method is further based on at least one of macro base station measurements and user equipment measurements.

23. The network node according to claim 17, wherein the signal processing and control circuit is configured to determine whether the GNSS signal is received directly from the GNSS or via the GNSS repeater by comparing the received GNSS signal with a reference GNSS timing to determine if receipt of the GNSS signal has been delayed in time compared to the time the GNSS signal would have been received had it been received directly from the GNSS.

24. The network node according to claim 23, wherein the network node is configured to request the reference GNSS timing by one or more of:
    sending a request to a user equipment served by the network node;
    using a precision time protocol to synchronize to another more reliable network node; and
    sending a request for pre-configured GNSS timings for one or more satellites.

25. The network node according to claim 17, wherein the signal processing and control circuit is configured to determine whether the GNSS signal is received directly from the GNSS or via the GNSS repeater by obtaining information regarding areas covered by GNSS repeaters, or locations of GNSS repeaters, via a backhaul network connection.

26. The network node according to claim 17, wherein the signal processing and control circuit is configured to determine whether the GNSS signal is received directly from the GNSS or via the GNSS repeater by receiving a pilot or reference signal from the GNSS repeater.

27. The network node according to claim 26, wherein the signal processing and control circuit is further configured to determine that the GNSS signal is received via the GNSS repeater when a level of the received pilot or reference signal is above a predefined threshold value.

28. The network node according to claim 26, wherein the pilot or reference signal comprises a GNSS repeater identifier.

29. The network node according to claim 17, wherein the signal processing and control circuit is configured to obtain measurements on radio environment characteristics in a served cell and to compare the measurements with characteristics of the GNSS signal, to determine whether the GNSS signal is received directly from the GNSS or via the GNSS repeater.

30. The network node according to claim 29, wherein the signal processing and control circuit is further configured to use the obtained measurements on radio environment characteristics and the characteristics of the GNSS signal to calculate at least one of maximum excess delays and root mean square delay spreads.

31. The network node according to claim 17, wherein the GNNS comprises a Global Positioning System (GPS) and the GNSS signal comprises a GPS signal.

* * * * *